United States Patent Office 3,123,330
Patented Mar. 3, 1964

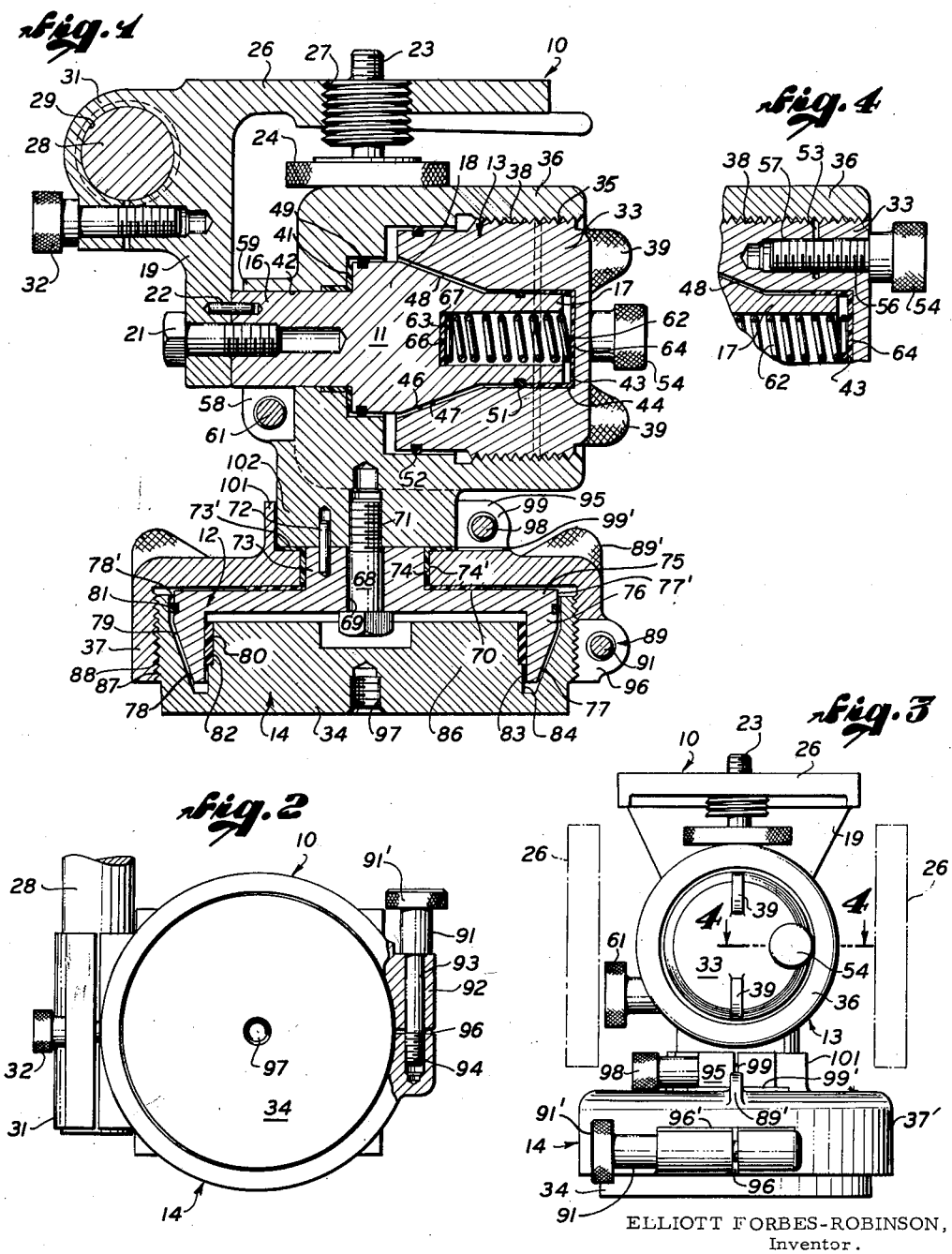

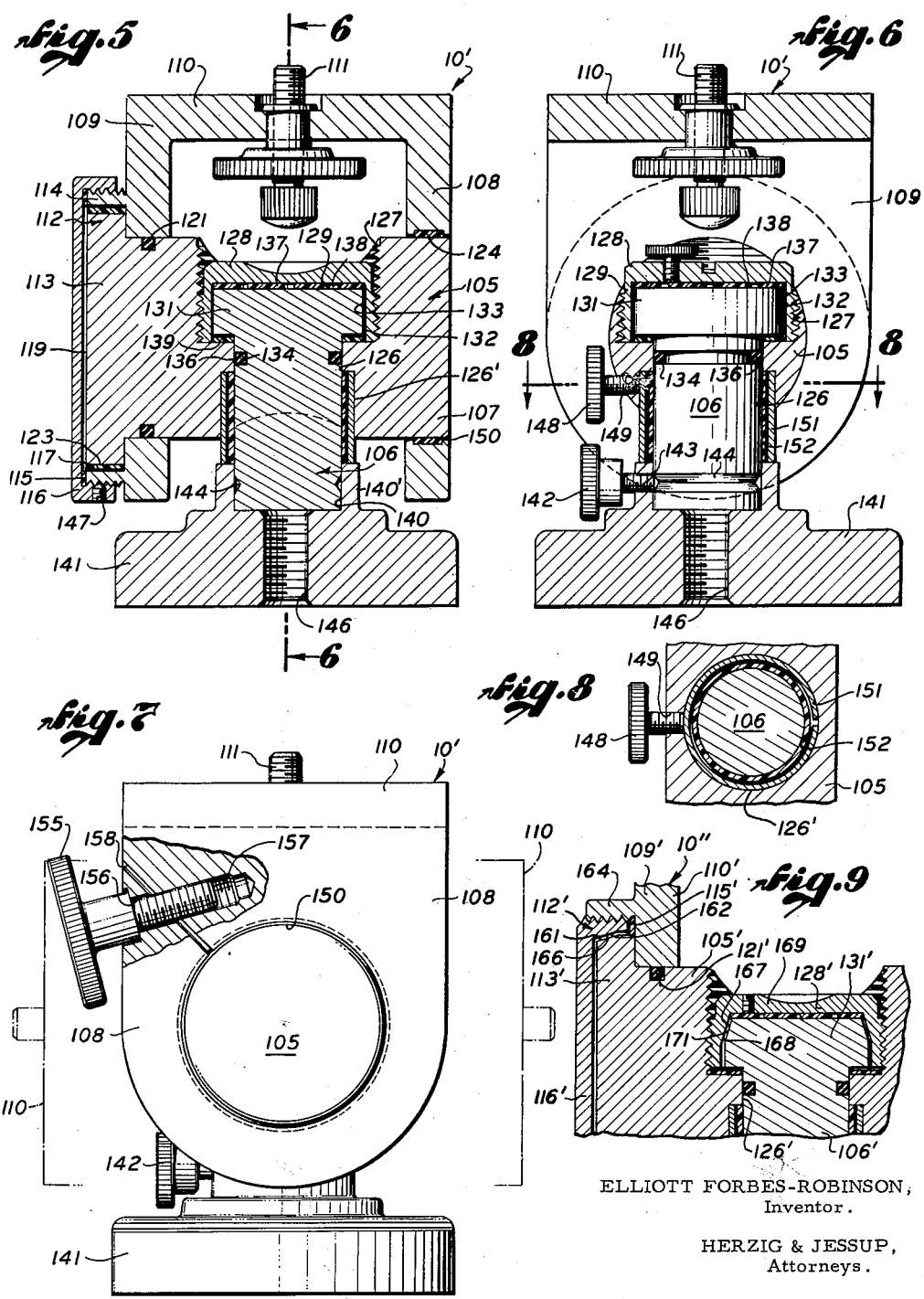

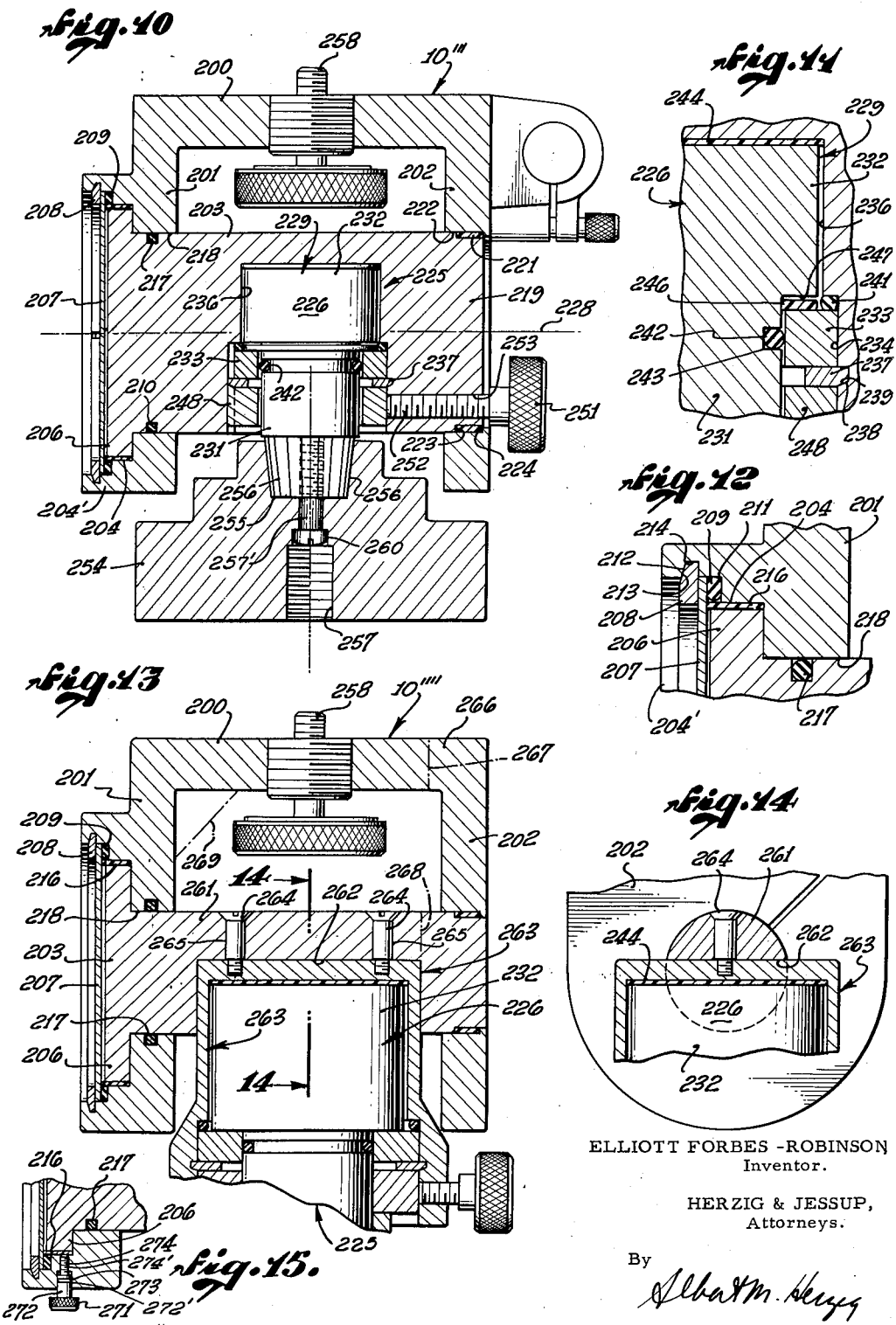

3,123,330
TRIPOD HEAD
Elliott Forbes-Robinson, Glendale, Calif., assignor to
TA Mfg. Corp., a corporation of California
Filed Nov. 27, 1959, Ser. No. 855,661
8 Claims. (Cl. 248—183)

This invention relates to a supporting head and more particularly to improved means for supporting a machine or instrument such as a motion picture camera or the like which permits the camera to be moved or "panned" smoothly to include desired subjects or actions during the photographing thereof.

Such a support is frequently employed under various and changing circumstances and temperatures and by different operators wherein, the efficiency of operation of the supporting means is substantially affected. Various devices for this purpose have heretofore employed fluid film shear resistance in an attempt to achieve a smoother and steadier operation of the head. Such devices have not been completely satisfactory due to the fact that the space in which the fluid film was confined either has been of constant and invariable dimension or to the fact that the fluid was not effectively confined. The fluids usually employed have been subject to change in viscosity as the temperature changes with resultant variation of the resistance to shear of the fluid film between the surfaces contacted by the film. In a colder climate, or in areas or during seasons in which the temperature is relatively low, if the viscosity of the fluid within the support increases appreciably, the result is a greater resistance to movement of the relative parts of the support, whereas, in higher temperatures the viscosity of the fluid appreciably decreases, allowing greater freedom of movement between the relative parts of the support the said changes in viscosity, regardless of the cause, frequently resulting in inoperativeness of the supporting means.

A further factor to be considered in developing the optimum efficiency of a motion picture camera support is the human factor. An operator of the camera can more efficiently operate or "pan" the camera when the movement of the support more nearly meets his own preference of inherent resistance to movement thereof on the support. Some operators prefer to have a support head which moves relatively freely, while other operators may prefer operating a camera on a support which has a greater resistance to such movement. Additionally, it is preferable to have a steadier and slower moving support for photographing subjects such as panoramic views and a freer moving support for photographing fast action.

Still further, the viscosity of the fluid employed creates other problems in that unless the fluid is effectively confined by appropriate seals, it causes the fluid to "creep" out of the fluid containing cavity and over the exterior of the head and tripod even though retained against seepage due to gravity.

It is therefor an object of this invention to provide a new and improved support for a camera and particularly a motion picture camera which is capable of allowing the camera to be moved or adjusted in one or more planes with a maximum of steadiness and smoothness in the movement thereof.

Another object of the invention is to provide a new and improved support of the character described in which adjustment of the resistance to movement in planes normal to each other is independently adjustable whereby the speed of movement or rather the response to a given force moving the camera is independently adjustable with the result that the speed of movement in each plane may be independently controlled or varied.

A still further object of the invention is to provide a new and improved support which is adapted to be secured both to a conventional foundation means, for example, a tripod and to a conventional camera.

Still another object of the invention is to provide a new and improved support which is capable of economical manufacture, is composed of few parts of simple design, and which is effective for its intended purpose.

A still further object of the invention is to provide a tripod head having adjustable fluid damping in which the cavities containing the damping fluid are effectively sealed to prevent the egress of the damping fluid therefrom.

With the foregoing objects in view, together with such additional objects and advantages as may subsequently appear, the invention resides in the parts, and in the construction, combination and arrangement of parts described by way of example, in the following specification of certain presently preferred embodiments of the invention, reference being had to the accompanying drawings which form a part of said specification and in which drawings:

FIG. 1 is a vertical, cross-sectional view taken as through the vertical axis of a support head constituting one presently preferred embodiment of the invention, FIG. 2 is a reduced scale, bottom plan view of the support head shown in FIG. 1, FIG. 3 is a side elevational view as viewed from the right hand side of FIG. 1, the scale being that of FIG. 2, FIG. 4 is a fragmentary view on the same scale as FIG. 1, the section being taken on the line 4—4 of FIG. 3, FIG. 5 is a vertical cross-sectional view, as taken through the vertical axis of a second embodiment of the support head embodying the present invention, FIG. 6 is a vertical cross-sectional view, as taken substantially along the lines 6—6 of FIG. 5, or in other words, at right angles to the section shown in FIG. 5, FIG. 7 is an end elevational view taken from the right hand side of FIG. 5, certain portions being broken away to disclose construction details otherwise concealed, FIG. 8 is a fragmentary cross-sectional view, taken in plan on the line 8—8 of FIG. 6, FIG. 9 is a fragmentary, vertical, cross-sectional view similar to FIG. 5 and showing details of a modified construction of certain portions of the embodiment shown in FIG. 5, FIG. 10 is a vertical, cross-sectional view, as taken substantially centrally through a third embodiment of this invention, FIG. 11 is an enlarged, fragmentary, vertical cross-sectional view showing details of certain fluid sealing means employed in the said third embodiment of the invention, FIG. 12 is an enlarged, fragmentary, vertical cross-sectional view showing details of other sealing means in said third embodiment of the invention in greater detail, FIG. 13 is a vertical, cross-sectional view taken on the vertical center line and showing a modification of a support such as shown in FIG. 10, FIG. 14 is a fragmentary, medial, sectional view taken on the line 14—14 of FIG. 13, and FIG. 15 is a fragmentary, cross-sectional view illustrating still another modification of the said third embodiment of the invention.

Referring to the drawings and particularly to FIGS. 1–4, there is shown a first embodiment of the invention generally referred to by the numeral 10. The support head 10 comprises a pair of cylindrical members 11 and 12 disposed with the axes thereof normal to each other, each being rotatable in one each of cylinder members 13 and 14. The member 11 includes a cylindrical shank portion 16 at one end thereof, a cylindrical portion 17 at the other end thereof, and an enlarged portion 18 intermediate of said ends. A bracket 19 constituting a means for mounting a machine, e.g., a camera, is secured to the shank portion 16 of the member 11 by a screw 21 and a dowel pin 22 whereby said bracket 19 is immovably attached to the member 11. The bracket 19 is provided with a screw 23 manually operable by an enlarged head 24 for engagement with a complementarily threaded hole in a camera to be mounted on the support. In the form here shown the screw 23 is threadedly mounted in a horizontal leg portion 26 of the bracket as in a threaded bore 27 thereof. As best seen in FIGS. 1 and 2, a handle 28 is clampingly secured within a bore 29 of a boss 31 by a thumb screw 32, said handle being the means by which the head and camera mounted thereon are manipulated or "panned."

Each of the cylinders 13 and 14 includes inner and outer sections, the inner sections being designated 33 and 34, respectively, and the outer sections being designated as 36 and 37, respectively. The inner section 33 is axially movable relative to the outer section 36 by the provision of external threads 35 on the inner section engaged with internal threads 38 on the outer section; the inner section 33 having finger pieces 39 by which it may be rotated.

The member 11 is supported for rotative movement at its end 16 in a flanged bearing bushing 41 disposed in a counterbored portion of the bore 42 in the outer section 36 of the cylinder 13 and at its other end by a cup-shaped bearing 43 lining a bore 44 of the inner section 33, the bearings 41 and 43 being preferably formed of a material having a high bearing capacity and an inherent low coefficient of friction such as nylon, or the like. As the specification proceeds, there will be references to plastic bushings, bearings or thrust washers and it will be understood that this general character of material is intended. As best seen in FIG. 1, the enlarged portion 18 of the member 11 is provided with an external frusto-conical surface portion 46 which is juxtaposed in closely spaced parallel relation to a complementary internal frusto-conical surface portion 47 which forms an enlargement of the bore 44 of the inner section 33, the space between said surfaces being designated by the numeral 48. Rotation and consequent axial movement of the inner section 33 within the outer section 34 will vary the space between said frusto-conical surfaces. The annular space 48 is sealed by a resilient O-ring seal 49 at one end of the enlarged portion adjacent the shank 16, a similar seal 51 on the cylindrical end 17, and another seal 52 interposed between adjacent surfaces of the inner and outer members 33 and 36 inwardly of the threaded interengagement therebetween.

The annular space 48, as limited by the seals 49, 51 and 52, is filled or charged with a viscous fluid material having high cohesive affinity for the surfaces of the space and which through its viscous and cohesive qualities as well as its resistance to shear, provides a yielding resistance to rotation of the member 11 relative to the cylinder structure 13.

As will be understood from the foregoing description, the inner section 33 being axially movable relative to the outer section 36 provides means for varying the distance between the surfaces bordering the fluid charged space 48. The closer the surface portions 46 and 47 are brought to each other, the greater the shear resistance of the fluid and the greater the resistance to relative movement between the parts with which the surfaces 46 and 47 are associated. Conversely, the separation of the surfaces 46 and 47 results in a decrease in the resistance to relative rotary movement between the parts to which these surfaces are united. This spacing of opposed surfaces is usually of the order of about .003" to .005" and consequently is shown in exaggerated form in the drawings.

When a desired degree of resistance has been achieved by this adjustment, the inner section or member 33 may be locked against inadvertent or accidental rotational movement by mis-phasing the threads 35 and 38. To this end, the locking means includes a slot 53 intersecting a portion of the inner section 33 (see FIG. 4) and a thumb screw 54 extending through a bore 56 and an aligned threaded bore 57 on opposite sides of the slot 53 serves to close the slot 53 to mis-phase the threads 38 relative to the threads 35 in the area of the slot, thereby locking the section 33 against movement in the section 36.

Means is also provided for locking the member 11 against rotation relative to the cylinder 13 after the bracket 19 is adjusted in a desired position thereon. For this purpose, a slot 58 is formed in a reduced diameter portion 59 surrounding the shank 16 of the member 11 and a clamp screw indicated at 61 operates across the slot 58 whereby the said reduced diameter portion 59 may be clamped around the shank 16 to prevent rotation of the member 11 relative to the cylinder 13.

To maintain the space 48 at the greatest width to which it is moved by the said adjustment, a spring means comprising a compression spring 62 is disposed within an axial bore 63 in the end 17 of the member 11, one end of said spring bearing against the bearing washer 67 seated on the end wall 66 of the bore 63 and the other end of said spring bearing against and reacting against the end of the cup-shaped bearing 43 at the outer end of the end portion 17 of the member 11.

The member 12 is provided with a short cylindrical shank portion 73, the end of which is secured in co-axial relation to the end of a larger cylindrical shank 102 depending from the cylinder 13 by a screw 68 extending through an axially disposed bore 69 in said shank portion 73 and engaging the axially disposed bore 71 in the cylindrical shank 102. A dowel pin 72 extending parallel to the screw 68 and engaging both shanks serves to prevent relative rotative movement between said shanks. The shank portion 73 is journaled in a flanged plastic bushing 74 having the body thereof seated in a bore 74' in the outer cylinder section 37, the flange 73' thereof engaging the outer end of said outer cylinder section and serving as a thrust bearing engaged by the end of the shank 102 and a plastic thrust washer 70 surrounds the shank 73 at the junction thereof with the body 75 of the cylindrical member 12 and cooperates with the bushing flange 73' to effect a minimum of friction with minimum axial play between the combined members 12 and 34 and the member 37.

The body portion 75 of the member 12 carries a depending peripheral wall portion 76 the outer surface of which from the upper end thereof to a point below the plane of the lower surface of said body member extends vertically downwardly as at 77' and is provided with a peripheral groove housing an O-ring gasket 81 which sealingly engages the complementary vertical wall portion 78' on the inner surface of the member 14. From the lower edge of the wall surface 77', the outer surface of the wall portion 76 extends downwardly in a converging, frusto-conical surface 77 which is laterally spaced from the complementary frusto-conical internal wall surface 78 of the member 14 which with the surface 78' thereof is formed as the outer wall surface of an annular groove 84 formed in the top surface of the body portion of the member 14 in which the annular wall portion 76 is rotatable. The inner wall 88 of said groove at the upper end thereof is reduced in diameter to form a seat for a plastic bushing 82 seated thereon and adapted to engage the inner face of the wall portion 76 of the member 12. The top surface of the body portion 86 of the member 14 extends in spaced parallel relation to the under surface of the member 12 and is provided with a shadow bore forming a clearance for the screw head 69. Thus, the O-ring seal 81 forms the space between the relatively rotating surfaces of the members 12 and 14 into a sealed cavity 79 in which a viscous fluid may be contained, the opposing frusto-conical surfaces 77 and 78 being adjustable to vary the space between them as will now be described.

The member 37 includes a depending annular wall 37' having internal threads 88 which engage the external threads 87 on the exterior of the member 14. Relative rotation between the members 14 and 37 as by rotation of the member 37 on the member 14 will vary the width of the space between the surfaces 77 and 78 and thus vary the resistance to relative rotative movement between the members 12 and 14, the said adjustment normally varying the width of said space between about .003″ and .005″, dependent on factors such as temperature, character of fluid, or the personal desire of the operator. The outer surface of the member 37 may be provided with one or more manually engageable lugs 89′ to assist in the relative rotation of this member.

Means is provided for locking the members 34 and 37 in adjusted position. The illustrated embodiment of such locking means comprises a boss 92 formed on the side of the member 37 and extending normal to the axis of said member. A slot 96 transversely bisects the boss and extends through the side wall of the member and a second slot 96′ extends along a side of the boss and through the side wall of the member, the said slots thus forming the thus separated portions of the member side wall and boss 92 into the ends of the circumferential clamp; said clamp being tightened and released by a thumb screw 91 having a head 91′ bearing against one end of the boss and having a shank extending through a bore 93 in said one end of said boss and with said shank terminating in a threaded end engaging a threaded bore 94 in the other portion of said boss. The member 34 is arranged for detachable mounting in a support, e.g., a tripod through the provision of the threaded hole 97 in the bottom thereof by which it may be secured by a suitable screw or bolt to the support on which it is to be mounted.

The members 36 and 12, which are united by the bolt 68 and pin 72 to move as a unit, may be secured in any desired rotative position relative to the cylinder forming members 34 and 37 by the clamp collar means comprising the annular wall 101 formed integrally with the member 37 and closely surrounding the shank end 102 of the member 36; said wall having a lateral boss 95 at one side thereof and separated into clamping ends by the transverse slot 99 and slot normal thereto 99′ which are drawn together or released by a thumb screw 98 to clamp or release the said shank end 102.

Referring next to FIGS. 5 through 8, there is shown another embodiment of a support head embodying the invention, said embodiment of a support head embodiment being generally referred to by the reference numeral 10′. The support head 10′ comprises a horizontally disposed cylindrical member 105 having, a vertically extending transverse bore 126 extending therethrough in which the body of a cylindrical member 106 is disposed affording a pivot on which the member 105 is rotatable. The member 105 includes a body portion 107 which at each end thereof affords bearing support for the defending arm portions 108 and 109 of a mounting bracket 110 to which a camera or the like may be secured by a mounting screw means 111. The member 105 at the end thereof adjacent the outer face of the arm 109 is provided with a coaxially disposed enlarged head 113 which is contained in a cylindrical recess 112 defined by a circular wall 114 projecting laterally outwardly from the side of the arm 109. Plastic bearing bushings 123 and 124 disposed, respectively, between the inner wall of recess 112 and the head 113 and between the arm 108 and the body 107 of the member 105 afford virtually frictionless pivotal movement of the bracket 110 on the member 105.

The exterior surface of the wall 114 is threaded for engagement with the complementary threads of the cap 116 having a end portion 117 covering the outer end of the recess 112 and presenting an inner surface 117 spaced from and parallel to the end of the head 113 and defining a space 119 therebetween. A compressible sealing gasket 115 is disposed between the end face of the wall 114 and the inner face of the cap 116 and the portion of the body 107 of the member 105 disposed within the opening in the arm 109 through which it extends is provided with an O-ring seal 121 disposed in a groove 122 in the member 105.

The space 119 is filled with a viscous fluid effective by its adherence to the opposed parallel surfaces of the cap 116 and end face of the head 113 and its own inherent shear resistance to yieldingly resist relative rotative movement of the bracket 110 on the member 105. Variation in the extent of such resistance is achieved by rotation of the cap 116 on the threaded exterior of the wall 114 with attendant greater and lesser compression of the gasket 115; the order of spacing between said surfaces generally being of about .003″–.010″. Escape of the fluid in the cavity 119 is prevented by the said gasket 115 and O-ring 121. A set screw 147 in the side wall of the cap 116 serves to secure the cap in adjusted position. The bracket 110 may be locked in any desired position in its range of movement on the member 105 by clamp means formed in the depending arm 108 by the slot 158 which extends to the bore 150 (see FIG. 7) in which the end of the member 105 is journaled, and the thumb screw 155 extending through the bore 156 of one side of the slot 158 and threadedly engaging a threaded bore 157 at the other side of said slot. Additionally, it will be noted that the cap 116 serves to prevent excessive end play of the bracket 110 on the member 105.

The bore 126 by which the member 105 is rotatably mounted on the member 106 is provided with an internally threaded counterbore 127 at the upper end thereof in which an externally threaded inverted cup-shaped cap 128 is adjustably mounted to form an enlarged diameter cylindrical space 129 in which the enlarged head portion 131 of the member 106 is contained. The lower end of the bore 126 is formed with a counterbore 126′ in which one end of a split sleeve bushing 151 is seated, the opposite end of said bushing resting on the end of the wall 140′ defining the socket 140 in which the lower end of the member 106 is seated and secured in desired rotative position by a thumb screw 142 engaging a threaded bore 143 extending through the wall 140′ and engaging a peripheral groove 144 in the member 106. It will be noted that the bushing 151 in addition to other functions to be described, serves to position the member 105 at a definite height above the base 141. Within the bushing 151 and surrounding the member 106 is a plastic bushing 152 of slightly less length than the bushing 151 whereby it is not subjected to end thrust deriving from the weight of the bracket and a camera or other machine mounted on the bracket. A thumb screw 148 threaded into a threaded bore in the member 105 and engaging the exterior of the bushing 151 (see FIG. 8) provides means for manually locking the member 105 against rotation on the member 106 when desired. A threaded bore 146 affords a means for connecting the base 141 to a tripod or the like.

The internal space 129 defined by the internal surface 133 of the cap 128 and the adjacent periphery of the head 131 forms a clearance space 132 to which further reference will be made. A plastic disc 137 affords bearing support between the inner end face of the cap 128 and the upper end of the head 131; said disc preferably having perforations 138 extending therethrough for passage of fluid. A bearing washer 139 is interposed between the underside of the head 131 and the bottom of the counterbore 127. The combined thickness of the head 131, the disc 137 and the washer 138 is slightly less than the distance between the underside of the cap 128 and the bottom of the counterbore 127 and forms an adjustable cavity which in addition to the space 132 is filled with a viscous, rotation resisting fluid, and an O-ring seal 134 in a groove 136 in the member 106 and engaging the bore 126 affords a fluid retaining seal for the said cavity. The head 131 is of sufficient diameter smaller than the inner diameter of the cap so that the space 132 is great enough not to be materially affected by the fluid therebetween and the rotation resisting space is that which is between the underside of the head 131 and the upper face of the washer 139, said space being subject to variation in clearance by adjustment of the cap member 127 to vary the resistance offered by the fluid and such clearance being generally within the limits previously set forth in connection with other embodiments of the invention.

FIG. 9 illustrates a modification of the second embodiment of the invention in that the adjusting principle of the first embodiment is shown applied to the second embodiment. In this figure the head is designated as 10″ and all parts which are similar to those in FIGS. 5–8 are given the same numbers with the added exponent "′."

In this modification, the outer or enlarged head end 113′ of the member 105′ is provided with an outwardly converging frusto-conical peripheral surface 161 and the outer side face of the depending arm 109′ carries an internally threaded annular wall 164 coaxially surrounding and spaced from the said head portion 113′. The threads of the wall 164 are engaged by the external threads of a cap 116′ surrounding the said head and having a complementarily tapered wall surface 162 which is coaxially disposed with respect to the surface 161 of the head and which by rotation of the cap 116′ is adjusted axially with resultant variation of the clearance of space between said surfaces and consequent variation in the damping effect imposed by viscous fluid confined in said space by the seals 115′ and 121′.

Likewise, the member 106′ which affords bearing support for the member 105′ is provided with an enlarged head 131′ having an upwardly converging frusto-conical peripheral surface 167. An externally threaded cap 128′ is mounted in the threaded, counterbored end of the bore 126′ and has a complementary, frusto-conical, inner wall surface 168 and an end wall 169 which combine with the said threaded counterbore to define a fluid containing cavity including the space 171 between the tapered surfaces 167 and 168 which is variable by axial variation of the cap 128′ with attandant variation of the damping effect of the fluid contained in the cavity.

FIGS. 10 through 12 illustrate a third embodiment of the invention which, while in general similar to the second embodiment, differs in details which adapt it to economical manufacture at the expense of some degree of the nicety of adjustment possible on the first and second embodiments. In other words, this embodiment is a cheaper form of the invention suitable for those users whose performance demands are less exacting and to whom price is an important consideration.

In this embodiment, the support is generally designated as 10‴ and includes a yoke element 200 having spaced depending arms 201 and 202 provided, respectively, with aligned bores 218 and 222 in which the horizontal cylindrical member 203 is disposed and on which member the yoke element is thus mounted for pivotal movement. The outer face of the arm 201 is provided with a counterbore 204 in which the enlarged head 206 of the member 203 is contained.

Outwardly beyond the counterbore 204, the arm 201 is provided with a slightly larger counterbore 204′ in the end face 211 of which is seated a resilient ring gasket 209. A cover plate 207 overlies the gasket 209 and closes the counterbores 204 and 204′, said cover plate being held in place by a split ring 208 engaging an annular groove 214 in the side wall of the counterbore 204′. As best shown in FIG. 12, the outer side face of the ring 208 is bevelled as at 212 and the corresponding face of the groove 214 is correspondingly bevelled as at 213 so that as the ring is expanded and moved radially outward in the groove, it moves the cover plate 207 inwardly against the resistance offered by the gasket 209 and resultantly moves the cover plate toward and away from the head 206 of the cylindrical member 203.

The member 203 is provided with a circumferential groove 210 in the area thereof encircled by the bearing bore 218 and seated in said groove is an O-ring seal 217. This seal and the gasket 209 serve to seal the space therebetween to confine a viscous rotation restraining fluid between the end face of the head 206 and the adjacent face of the plate 207. This space is of the order of about .003″–.005″, the variation being achieved through opening and closing the ring 208. Spreading the ends of the ring apart will cause the ring to "bottom" in the groove with resultant minimum clearance between the plate 207 and the head 206 and consequent maximum resistance to rotative movement between the yoke element and the member 203, and vice versa. The angle of the bevelled faces of the ring and groove are sufficiently slight to retain the ring in any position to which it is opened or closed. To confine the resistance of movement of the yoke 200 about the member 203 as nearly as possible to the fluid, the actual bearing load is carried by a pair of plastic bearings comprising a bearing bushing 216 interposed between the periphery of the head 206 and side wall of the counterbore 204 and a second plastic bearing bushing 221 seated on the reduced diameter end 219 of the member 203 and engaging the bore 222 in the arm 202. Shoulders 223 and 224 on the member 203 and at the outer end of the bore 222 (see FIG. 10) engage the opposite ends of the bushing 221 to prevent endwise movement thereof. The yoke 200 may be secured in adjusted position on the member 203 by any suitable clamping means, the type shown in FIG. 7 being an example, the bushing 221 being sufficiently compressible to allow the portion of the bore 222 directly overlying the surface of the member 203 to achieve firm clamping engagement therewith.

The member 203 at about the midlength thereof is provided with a transverse bore 236 which does not extend through the member 203 and the bottom of the bore 236 is provided with a plastic disk thrust bearing 244 which engages the top surface of a cylindrical head portion 226 of a bearing member 225 disposed in the bore 236 and about which the member 203 is rotatable. The bearing member 225 below the head portion 236 thereof includes a reduced diameter body portion 231 and a tapered, longitudinally serrated shank portion 256 seated in a complementary tapered socket 255 in a base 254 by a screw 260 extending into said socket in the axial line thereof through a bore 257′ formed as an extension of the threaded bore 257 in said base by which the base is secured to a tripod or the like (not shown), the lower end of said bore 257′ being counterbored to accommodate the head of the screw 260. The yoke is also provided with a screw 258 for attaching a camera or the like thereto.

The outer end of the bore 236 comprises a counterbore 234 through which the shank portion 231 of the bearing member 225 extends. A resilient sealing gasket 241 is seated at the bottom of the counterbore 234 and a flat plastic bearing washer 246 is interposed between a ring 233 seated in the counterbore 234 and closely surrounding the shank 231, said ring being retained in the counterbore 234 by a split ring 237 having a bevelled outer face 238 engaging the correspondingly bevelled face 239 engaging the correspondingly bevelled face 239 of a groove 240 in the wall of the counterbore 234. An O-ring seal 242 is seated in the groove 243 in the shank 231 and engages the inner face of the ring 233 to combine with the gasket 241 to seal the space surrounding the head 226 of the bearing member 225 in the bore 236, said space being filled with a viscous, rotation resisting fluid. The adjustment of said space by spreading or closing the ends of the ring 237 effects a slight axial variation of the clearance between the under side of the head 226 and the adjacent surface of the plastic bearing washer 246 in the same manner as does the similar adjustment of the ring 208.

Primarily, this embodiment of the invention is one which is adjusted at the factory or by a dealer to give the purchaser a desired resistance to movement between the components of the head device and unlike the previously described embodiments is not intended for individual adjustment by the user. Obviously the simple construction thus made possible enables this version of the device to be manufactured and sold at a lower price than the said previously described embodiments.

Means is provided for locking the member 203 against rotation on the member 225, said means comprising a split spring ring 248 compressed to fit within the outer end of the counterbore 234 and having an inner face normally spaced from the surface of the shank 231, said ring being keyed to the wall of the counterbore at a point opposite the split in the ring effective to prevent relative rotation between the ring and the member 203. One of the ends of the ring 248 is engaged by the end of a thumb screw 251 having a body 252 threadedly engaging a bore in the end 219 of the member 203, said screw being effective to cause the engaged end of the ring 248 to clampingly engage the shank 231.

FIGS. 13 through 15 illustrate a modification of the third embodiment of the invention characterized by further manufacturing simplification and adaptation for use particularly with the lighter weight motion picture cameras, those using 8 mm. and 16 mm. film. In these figures, like parts have been given the same identifying numbers as in FIGS. 10–12. The device as a whole is designated by 10'''' and includes the yoke 200 having depending arms 201 and 202 pivotally mounted on the smaller diameter body 261 of the member 203. The fluid containing cavity and the adjustment thereof relative to the head 206 are the same as previously described as are also the bearing means and gasket means associated therewith together with the means for clamping the yoke against movement of the body 261 (see FIG. 14).

The side of the cylindrical body 261 is relieved to form a recess 262 in which the head end of a hollow cylindrical member 263 is seated and secured by screws 264, 264 extending through bores 265, 265 from the other side of the body 261. By this means, a smaller lighter yoke can be provided as well as a smaller and lighter mounting therefor. The interior of the member 263 forms the equivalent of the bore 236 and counterbore 234 for the reception of the end of the member 225 in the same manner and by the same means as is employed in the forms shown in FIGS. 10, 11 and 12.

For extremely light equipment, even the arm 202 of the yoke 200 can be dispensed with by forming the support with only the depending arm 201, the portion thereof to the right of the line 267 in FIG. 13 being omitted. The member 203 can also be terminated to the right of the line 268 in said figure. Since this eliminates the clamping means for securing the yoke in adjusted position, a means such as shown in FIG. 15 can be employed. This alternative means comprises a thumb screw 271 having a cylindrical body 272 carrying an O-ring seal 273 disposed in a bore 272' in the side wall of the counterbore 204 and having a reduced diameter threaded in 274 extending through and engaging a threaded bore 274' into the counterbore 204 to engage the bearing bushing 216 and clamp it against the periphery of the head 206 to lock the yoke or its equivalent against rotative movement on the member 261. It will be appreciated, of course, that this locking means can be employed, if desired, on any of the other embodiments of the invention shown in FIGS. 5 through 14.

It will be noted that all of the embodiments of the invention and the modifications thereof disclosed embody the principle of interposing bearing means between the relatively moving parts possessing the lowest possible frictional resistance to movement, wherefore, the maximum resistance is that derived from the viscous fluid. As a consequence, a wider range of adjustment is possible than would be possible if the bearing resistance constituted any significant portion of the total resistance to movement.

While in the foregoing specification and drawings there have been disclosed certain presently preferred embodiments of the invention, such disclosure and description has been by way of example only and it is appreciated that changes and modifications will suggest themselves to others skilled in the light of the foregoing description. Consequently it is not to be assumed that the invention is limited to the forms thereof so disclosed and it will be understood that the invention includes as well, all such changes in the parts and in the construction, combination and arrangement of parts as shall come within the purview of the appended claims.

What I claim as new and desire to secure by Letters Patent is:

1. In a camera tripod head, a base provided with means for attachment to a tripod, a camera supporting member disposed above said base and provided with means for attaching a camera thereon, and separate devices interposed between said base and said member and mounting said member on said base with capacity for movements of said member relative to said base about a horizontal axis and a vertical axis respectively; each of said devices including fluid damping means imposing damping resistance to movement of said member relative to said base about at least one of said axes; said fluid damping means comprising an enclosed cavity bounded in part by closely spaced, parallel wall surfaces movable relatively to each other incident to movement of said member about the axis with which the cavity is associated, a viscous fluid in said cavity contacting said wall surfaces and by reason of its cohesive affinity for said surfaces and its resistance to shear, imposing yielding resistance to said relative movement, a pair of contacting and correspondingly relatively moving bearing surfaces disposed adjacent to and supporting one each of said wall surfaces in parallel relation to the other wall surface and having a frictional resistance to the said relative movement thereof which is substantially less than the resistance offered by said fluid, a sealing means associated with said bearing surfaces effective to retain said fluid in said cavity, and manually operable means disposed wholly exteriorly of the one of said cavities associated with one of said axes operable to releasably lock said member against movement about said one of said axes.

2. A camera tripod head as claimed in claim 1 in which the parallel wall surfaces defining the cavity for the fluid damping means associated with at least one of said axes comprises closely spaced, frusto-conical surfaces and in which means is provided for moving one of said frusto-conical surfaces axially toward or away from the other surface with resultant increase or decrease in the radial distance therebetween and consequent variation of the resistance to shear of the fluid in the cavity bounded by said surfaces and consequent increase or decrease in the damping force imposed by said fluid.

3. A camera tripod head as claimed in claim 2 in which said means for moving said frusto-conical surfaces toward and away from each other comprises manually operable, screw threaded means.

4. In a camera tripod head mechanism, a base member, a camera supporting member disposed above said base and having means for attaching a camera thereon, and devices interposed between and mounting said camera supporting member on said base with capacity of movement thereof relative to said base about two axial lines normal to each other; said devices comprising a first bearing means including a vertical axis journal component carried by said base and a bearing member rotatable thereon, a second bearing means including horizontal axis journal and bearing components carried by said first named bearing means and carrying said camera supporting member thereon for movement relative about said horizontal axis, fluid damping means associated with each of said journal and bearing means; each of said damping means comprising an enclosed cavity defined in part by a wall surface having fixed relation to the journal component of the bearing means, a second wall surface parallel to and closely spaced from said first wall surface and having fixed relation to the bearing component of the journal and bearing means, a resilient, compressed sealing ring interengaging the contacting surfaces of the journal and bearing means and interposed between said cavity and the exterior of said head, a viscous fluid filling said cavity; said fluid by its cohesive affinity for said wall surfaces and its resistance to shear, imposing yielding resistance to relative movement between the journal and bearing means with which said wall surfaces are associated, and separate manually operable means associated with each of said damping means and disposed wholly exteriorly of the cavity of the damping means with which it is associated and being operable to releasably lock said head mechanism against movement about the axis of the said associated damping means.

5. A camera tripod head mechanism as claimed in claim 4 in which the said parallel wall surfaces of the cavity associated with at least one of said bearing means comprises closely spaced, coaxially disposed frusto-conical surfaces carried, respectively, by the bearing and journal components of the bearing means and which includes adjusting means operable to effect relative axial movement between said bearing and journal components with resultant change in the spacing between said frusto-conical surfaces and consequent adjustment of the damping resistance offered by the fluid in said cavity.

6. A camera tripod head mechanism as claimed in claim 4 in which said parallel walls of at least one of said cavities are disposed normal to the axis of the movement of the bearing means with which the cavity is associated and in which means is provided for varying the spacing between said walls by movement of the one of said walls associated with the bearing component axially of said bearing means.

7. A camera tripod head mechanism as claimed in claim 4 in which said parallel walls of at least one of the cavities associated with the said bearing means are disposed normal to the axis of movement of the associated bearing means and in which the one of said walls carried by the bearing component of such bearing means is adjustably movable on and relative to the bearing component axially of said axis of movement with resultant change in the spacing between said walls and consequent adjustment of the damping resistance offered by the fluid in the cavity bounded by said walls.

8. In a camera tripod head, a base having means for connection to a tripod, a camera supporting member having means for attaching a camera thereto disposed above said base, and devices interposed between and interconnecting said base and said support and permitting movements of said supporting member relative to said base both about a horizontal axis and separate movements about a vertical axis; said devices including a first, adjustable, fluid damping means imposing yielding resistance to said movements about said horizontal axis, and a second, adjustable fluid damping means imposing yielding resistance to said separate movements about said vertical axis; each of said adjustable fluid damping means comprising a cavity including spaced, parallel wall portions disposed in planes normal to the axes of the movements to be damped and being movable relatively to each other incident to movement of said supporting member relative to said base, a viscous fluid in said cavity, means for varying the distance between said wall portions, a pair of contacting and relatively moving bearing surfaces interposed between said cavity and the exterior surface of said head; said bearing surfaces being associated one each with each of said wall portions, resilient sealing means in said bearing surfaces effective to retain said fluid in said cavity and separate manually operable means associated with each of said damping means and disposed wholly exteriorly of the cavity of the damping means with which it is associated and being operable to releasably lock said head mechanism against movement about the axis of the said associated damping means.

References Cited in the file of this patent

UNITED STATES PATENTS

| | | |
|---|---|---|
| 1,723,294 | Mitchell | Aug. 6, 1929 |
| 2,080,279 | Kellogg | May 11, 1937 |
| 2,459,040 | Miller | Jan. 11, 1949 |
| 2,514,313 | Davidson et al. | July 4, 1950 |
| 2,905,421 | O'Connor | Sept. 22, 1959 |

FOREIGN PATENTS

| | | |
|---|---|---|
| 561,747 | Great Britain | June 2, 1944 |